Patented Dec. 27, 1938

2,141,687

UNITED STATES PATENT OFFICE 2,141,687

HYDROXYPHENYLAMINO-ANTHRACENE AND PROCESS OF MAKING SAME

Ernst Dür, Basel, Switzerland, assignor to the firm Society of Chemical Industrie in Basle, Basel, Switzerland No Drawing. Application January 5, 1938, Serial No. 183,537. In Switzerland August 23, 1933

3 Claims. (Cl. 260—571)

It has been found that the 4'-hydroxyphenylaminoanthracenes of the general formula

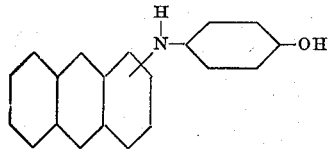

can be obtained by heating hydroxyanthracenes of the general formula

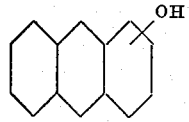

in the presence of alkali metal bisulfite solution with 4-amino-1-hydroxybenzene.

The following example illustrates the invention, the parts being by weight:—

10 parts of β-hydroxyanthracene, 20 parts of water and 100 parts of sodium bisulfite solution of 42 per cent. strength are boiled in a reflux apparatus for about 2 hours. After addition of 7 parts of p-aminophenol boiling is continued for 48 hours. The desired product crystallizes from the cold solution in light colored crystals.

This application is a continuation-in-part of my application Serial No. 739,357 filed August 10, 1934.

What I claim is:
1. The compound of the formula

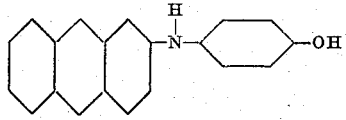

2. A process for the manufacture of products of the general formula

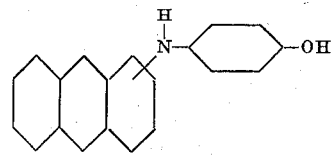

comprising boiling under reflux a product of the general formula

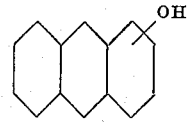

together with an alkali metal bisulfite and 4-amino-1-hydroxybenezene until the desired product is formed.

3. A process for the manufacture of

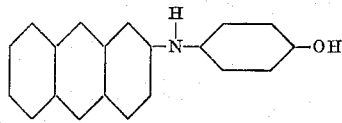

comprising boiling under reflux

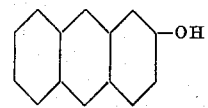

together with an alkali metal bisulfite and 4-amino-1-hydroxybenzene until the desired product is formed.

ERNST DÜR.